(12) United States Patent
Fang (10) Patent No.: US 9,225,169 B1
(45) Date of Patent: Dec. 29, 2015

(54) ISOLATED SIGNAL TRANSMITTING DEVICE, ISOLATED SIGNAL TRANSMITTING CIRCUIT AND RECEIVING CIRCUIT THEREOF

(71) Applicant: YOTTACONTROL CO., Kaohsiung (TW)

(72) Inventor: Cheng-Jen Fang, Kaohsiung (TW)

(73) Assignee: YOTTACONTROL CO., Kaohsiung (TW)

( * ) Notice: Subject to any disclaimer, the term of this patent is extended or adjusted under 35 U.S.C. 154(b) by 0 days.

(21) Appl. No.: 14/515,745

(22) Filed: Oct. 16, 2014

(30) Foreign Application Priority Data

Jul. 22, 2014 (CN) .......................... 2014 1 0353301

(51) Int. Cl.
*H03B 1/00* (2006.01)
*H02J 1/08* (2006.01)
*H02J 1/00* (2006.01)

(52) U.S. Cl.
CPC ............. *H02J 1/08* (2013.01); *H02J 2001/008* (2013.01)

(58) Field of Classification Search
None
See application file for complete search history.

(56) References Cited

U.S. PATENT DOCUMENTS 7,050,509 B2 * 5/2006 Krone ................. H04L 25/0266
  375/285
8,970,264 B2 * 3/2015 Pion ........................ H03F 3/085
  327/110

* cited by examiner

*Primary Examiner* — Long Nguyen
(74) *Attorney, Agent, or Firm* — patenttm.us (57) ABSTRACT

An isolated signal transmitting device, an isolated signal transmitting circuit and an isolated receiving circuit thereof are provided to transmit analog signals and digital signals not commonly grounded. The isolated signal transmitting device adapts one current loop for transmitting the analog signals and the digital signals in two opposite directions. The isolated signal transmitting device has two optical couplers to isolate an input and an output of the isolated signal transmitting device not commonly grounded, and the coupled analog signals and the coupled digital signals have respective outputs. Then a user can determine whether the signal is digital or not according to the respective output.

10 Claims, 4 Drawing Sheets

ISOLATED SIGNAL TRANSMITTING DEVICE, ISOLATED SIGNAL TRANSMITTING CIRCUIT AND RECEIVING CIRCUIT THEREOF

BACKGROUND OF THE INVENTION

1. Field of the Invention

The present invention relates to an isolated signal transmitting device, an isolated signal transmitting circuit and a receiving circuit thereof, and especially relates to a transmitting device for separately transmitting digital signals and analog signals, wherein an input and output of the transmitting device are not commonly grounded.

2. Description of the Related Art

Multiple common power supplies that are electronically connected with each other in parallel or series are commonly grounded. Namely, when the multiple power supplies respectively supply multiple loads, the multiple loads are commonly grounded. One of the power supplies is the master power supply, and the others are slave power supplies. A user can control the master power supply to transmit control signals for controlling whether the slave power supplies supply power to the loads or not. Firstly, the user electronically connects the master power supply and the slave power supplies according to a signal transmitting circuit, and respectively sets output voltages of the slave power supplies. Then, the user electronically connects the loads with outputs of the slave power supplies, and the user can turn on or off of the slave power supplies by controlling the master power supply to determine whether the loads are powered or not.

For example, the master power supply outputs an output voltage of 15 volts to a first load, and the slave power supply outputs an output voltage of 3.3 volts to a second load. The user can simultaneously turn on the master power supply and the slave power supply to power the first load and the second load, or may turn on the master power supply firstly and turn on the slave power supply after a while, depending on demand of the user.

The master power supply and the slave power supply are commonly grounded because the signal transmitting circuit is designed according to the principle of common ground. Therefore, the outputs of the master power supply and the slave power supply are commonly grounded, and the first load and the second load have only one ground voltage. When the user needs to power multiple loads and the multiple loads cannot be commonly grounded, the signal transmitting circuit cannot be used to electronically connect the master power supply and the slave power supply. The user needs to separately and manually turn on each of the master power supply and the slave power supply, and the user cannot precisely turn on the master power supply and the slave power supply at the same time. Therefore, the signal transmitting circuit needs to be improved.

SUMMARY OF THE INVENTION

An objective of the present invention is to provide an isolated signal transmitting device, an isolated signal transmitting circuit and a receiving circuit thereof for transmitting signal without sharing common ground.

To achieve the foregoing objective, the isolated signal transmitting circuit comprises an analog signal input, a digital signal input, a first cross port, a second cross port, a first operational amplifier, a metal-oxide-semiconductor field-effect transistor (MOSFET), a PNP current mirror, a first resistor, a third resistor, a fourth resistor, and an eighth resistor.

The first operational amplifier comprises a positive input, a negative input and an output. The positive input is grounded, the negative input is electronically connected to the first cross port, and the output is electronically connected to the second cross port. The first resistor is electronically connected between the negative input and the analog signal input.

The MOSFET comprises a gate, a source and a drain. The source is electronically connected to a power input negative terminal. The third resistor is electronically connected between the source and the gate, and the fourth resistor is electronically connected between the drain and the negative input of the first operational amplifier.

The PNP current mirror comprises a first PNP transistor and a second PNP transistor. The first PNP transistor and the second PNP transistor each comprise an emitter, a base and a collector. The emitter of the first PNP transistor and the emitter of the second PNP transistor are electronically connected to a power input positive terminal. The base of the first PNP transistor and the base of the second PNP transistor are electronically connected to each other, and are electronically connected to the collector of the first PNP transistor. The collector of the second PNP transistor is electronically connected to the gate of the MOSFET. The eighth resistor is electronically connected between the collector of the first PNP transistor and the digital signal input.

The isolated signal receiving circuit comprises a third cross port, a fourth cross port, a first optical coupler, a second optical coupler, an analog signal output, a digital signal output, a second resistor, and a fifth resistor.

The first optical coupler comprises a first input anode, a first input cathode, a first output anode, and a first output cathode. The first input anode is electronically connected to the third cross port, the first input cathode is electronically connected to the fourth cross port, and the first output cathode is electronically connected to a power output negative terminal. The second resistor is electronically connected between the first output anode and the analog signal output.

The second optical coupler comprises a second input anode, a second input cathode, a second output anode, and a second output cathode. The second input anode is electronically connected to the fourth cross port, the second input cathode is electronically connected to the third cross port, the second output anode is electronically connected to the digital signal output, and the second output cathode is grounded. The fifth resistor is electronically connected between the second output anode and a power output positive terminal.

The present invention can respectively transmit analog signals or digital signals. When signals are transmitted from the isolated signal transmitting circuit to the isolated signal receiving circuit, the first cross port is electronically connected to the third cross port, and the second cross port is electronically connected to the fourth cross port.

In an analog signal transmitting mode, a voltage of the digital signal input is set same as a voltage of the power input positive terminal for controlling the third resistor having no current flowing through, and a voltage between the gate and the source of the MOSFET is zero volt. Therefore, the MOSFET has no drain current, and namely the drain current of the MOSFET is zero ampere. A voltage analog signal is input to the analog signal input, and is transformed from a voltage signal to a current signal according to a current loop from the analog signal input, the first resistor, the first input anode and the first input cathode of the first optical coupler, and into the output of the first operational amplifier. The current analog signal can be coupled to the first output anode and the first output cathode of the first optical coupler through the first optical coupler. The coupled current analog signals can be transformed from current signals to voltage signals by the second resistor, and then the analog signal output can obtain the voltage analog signal.

In a digital signal transmitting mode, a voltage of the analog signal input is set same as the ground, namely zero volt. Then, a voltage digital signal is input to the digital signal input to control whether the PNP current mirror has current for determining whether the MOSFET is on or off. When a voltage of the voltage digital signal is zero volt, which means digital signal zero, the PNP current mirror has current flowing through the third resistor. Therefore, a gate to source voltage of the MOSFET is not zero volt, and the MOSFET has the drain current. The drain current flows from the output of the first operational amplifier, through the second input anode and the second input cathode of the second optical coupler, the fourth resistor, and the MOSFET, and then into the power input negative terminal. The drain current can be coupled to the second output anode and the second output cathode of the second optical coupler through the second optical coupler. When the second output anode and the second output cathode of the second optical coupler have current flowing through, the digital signal output is grounded, and the digital signal output can determine the digital signal zero.

On the other hand, when the voltage of the digital signal is same as the voltage of the power input positive terminal, which means digital signal one, the PNP current mirror has no current flowing through the third resistor. Therefore, the gate to source voltage of the MOSFET is zero volt, and the MOSFET has no drain current. Then, the second output anode and the second output cathode of the second optical coupler do not couple any current. A voltage of the digital signal output is same as the power output positive terminal, and the digital signal output can determine the digital signal one.

When the present invention is in the analog signal transmitting mode or in the digital signal transmitting mode, the analog signal and the digital signal are transmitted through the same current loop by two opposite directions and two different optical couplers. The isolated signal transmitting circuit and the isolated signal receiving circuit are electronically connected by two electric wires, one electric wire for connecting the first cross port and the third cross port, and the other electric wire for connecting the second cross port and the fourth cross port. Further, the isolated signal receiving circuit respectively couples the analog signal and the digital signal by the first optical coupler and the second optical coupler, and respectively outputs the analog signal and the digital signal to the analog signal output and the digital signal output. Therefore, there is no need to determine whether a receiving signal is the analog signal or the digital signal.

To sum up, the analog signal and the digital signal are transmitted through the first optical coupler and the second optical coupler, so an input and an output of the present invention are not commonly grounded. Further, the present invention can transmit the analog signal and the digital signal in the same current loop to simplify the connection between the isolated signal transmitting circuit and the isolated signal receiving circuit.

Other objectives, advantages and novel features of the invention will become more apparent from the following detailed description when taken in conjunction with the accompanying drawings.

DETAILED DESCRIPTION OF THE INVENTION

Figure 1:
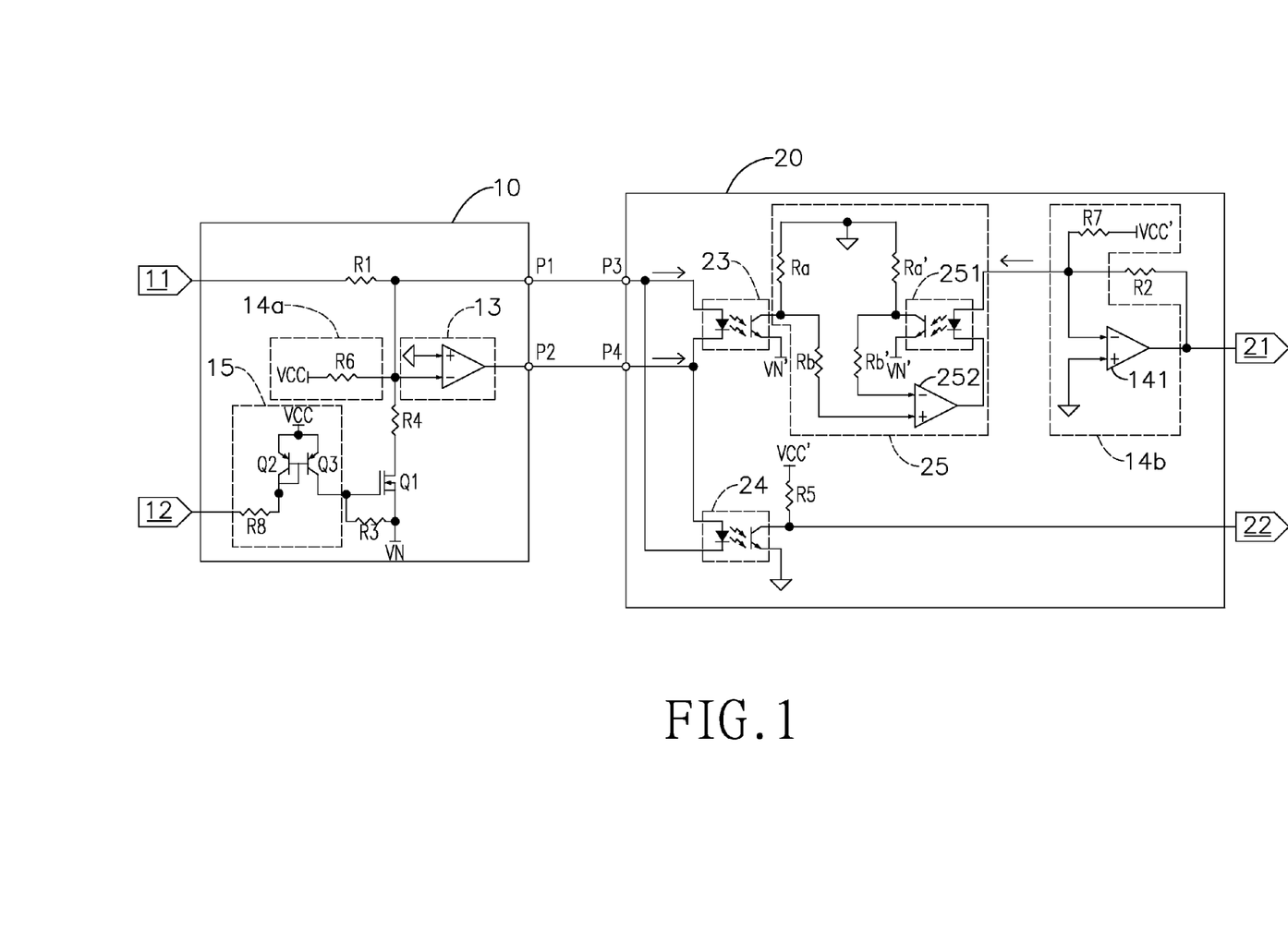
FIG. 1 is a circuit diagram of an embodiment of the present invention.

With reference to FIG. 1, the present invention is an isolated signal transmitting device, an isolated signal transmitting circuit 10, and an isolated signal receiving circuit 20. The isolated signal transmitting circuit 10 comprises an analog signal input 11, a digital signal input 12, a first cross port P1, a second cross port P2, a first operational amplifier 13, a metal-oxide-semiconductor field-effect transistor (MOSFET) Q1, a PNP current mirror 15, a first resistor R1, a third resistor R3, and a fourth resistor R4.

The first operational amplifier 13 comprises a positive input, a negative input, and an output. The positive input is grounded, the negative input is electronically connected to the first cross port P1, and the output is electronically connected to the second cross port P2. The first resistor R1 is electronically connected between the negative input and the analog signal input 11.

The MOSFET Q1 comprises a gate, a source and a drain. The source is electronically connected to a power input negative terminal VN. The third resistor R3 is electronically connected between the source and the gate, and the fourth resistor R4 is electronically connected between the drain and the negative input of the first operational amplifier 13.

The PNP current mirror 15 is electronically connected between the digital signal input 12 and the gate of the MOSFET Q1, and comprises a first PNP transistor Q2, a second PNP transistor Q3, and an eighth resistor R8. The first PNP transistor Q2 and the second PNP transistor Q3 each comprise an emitter, a base and a collector. The emitter of the first PNP transistor Q2 and the emitter of the second PNP transistor Q3 are electronically connected to a power input positive terminal VCC. The base of the first PNP transistor Q2 and the base of the second PNP transistor Q3 are electronically connected to each other, and are electronically connected to the collector of the first PNP transistor Q2. The collector of the second PNP transistor Q3 is electronically connected to the gate of the MOSFET Q1. The eighth resistor Q8 is electronically connected between the collector of the first PNP transistor Q2 and the digital signal input 12. In the embodiment, power of the first operational amplifier 13 is supplied by the power input positive terminal VCC and the power input negative terminal VN.

When the isolated signal transmitting circuit 10 transmits an analog signal, a voltage of the digital signal input 12 is same as a voltage of the power input positive terminal VCC, and the PNP current mirror 15 has no current flowing through the third resistor R3. Therefore, a gate to source voltage of the MOSFET Q1 is zero volt to control the MOSFET Q1 to remain off, and then the MOSFET Q1 has no drain current. The analog signal is input into the analog signal input 11 and through the first resistor R1 to the first cross port P1. Then the analog signal can be output from the first cross port P1, be transmitted to the second cross port P2 through the isolated signal receiving circuit 20, and further be input into the output of the first operational amplifier 13.

When the isolated signal transmitting circuit 10 transmits a digital signal, a voltage of the analog signal input 11 is same as the ground, and when a voltage of the digital signal is zero volt, namely, digital signal zero, the PNP current mirror 15 has current flowing through the third resistor R3. Therefore, a gate to source voltage of the MOSFET Q1 is not zero volt to control the MOSFET Q1 to remain on, and then the MOSFET Q1 has the drain current. The drain current is output from the output of the first operational amplifier 13 to the second cross port P2. Then the digital signal can be output from the second cross port P2, be transmitted to the first cross port P1 through the isolated signal receiving circuit 20, and further be transmitted through the fourth resistor R4, the MOSFET Q1 and to the power input negative terminal VN.

The isolated signal receiving circuit 20 comprises a third cross port P3, a fourth cross port P4, a first optical coupler 23, a second optical coupler 24, an analog signal output 21, a digital signal output 22, a second resistor R2, and a fifth resistor R5.

The first optical coupler 23 comprises a first input anode, a first input cathode, a first output anode, and a first output cathode. The first input anode is electronically connected to the third cross port P3, the first input cathode is electronically connected to the fourth cross port P4, and the first output cathode is electronically connected to a power output negative terminal VN'. The second resistor R2 is electronically connected between the first output anode and the analog signal output 21.

The second optical coupler 24 comprises a second input anode, a second input cathode, a second output anode, and a second output cathode. The second input anode is electronically connected to the fourth cross port P4, the second input cathode is electronically connected to the third cross port P3, the second output anode is electronically connected to the digital signal output 22, and the second output cathode is grounded. The fifth resistor R5 is electronically connected between the second output anode and a power output positive terminal VCC'.

When the isolated signal receiving circuit 20 receives the analog signal from the isolated signal transmitting circuit 10, the analog signal is transmitted from the third cross port P3 to the first input anode of the first optical coupler 23, and then the analog signal is output from the first input cathode of the first optical coupler 23 to the fourth cross port P4. Further, the analog signal is coupled from the first output anode and the first output cathode of the first optical coupler 23, and is transmitted to the analog signal output 21.

When the isolated signal receiving circuit 20 receives the digital signal from the isolated signal transmitting circuit 10, the digital signal is transmitted from the fourth cross port P4 to the second input anode of the second optical coupler 24, and then the digital signal is output from the second input cathode of the second optical coupler 24 to the third cross port P3. Further, the digital signal is coupled from the second output anode and the second output cathode of the second optical coupler 24, and is transmitted to the digital signal output 22.

On a whole, the isolated signal transmitting device comprises the isolated signal transmitting circuit 10 and the isolated signal receiving circuit 20. When the isolated signal transmitting circuit 10 and the isolated signal receiving circuit 20 are electronically connected together to form the isolated signal transmitting device, the first cross port P1 of the isolated signal transmitting circuit 10 is electronically connected to the third cross port P3 of the isolated signal receiving circuit 20 and the second cross port P2 of the isolated signal transmitting circuit 10 is electronically connected to the fourth cross port P4. Therefore, the first input anode of the first optical coupler 23 can be electronically connected to the analog signal input 11 through the first resistor R1 for receiving the analog signal, and the second input anode of the second optical coupler 24 can be electronically connected to the output of the first operational amplifier 13 for receiving the digital signal.

In an analog signal transmitting mode of the isolated signal transmitting circuit 10 and the isolated signal receiving circuit 20, the voltage of the digital signal input 12 is same as the voltage of the power input positive terminal VCC to control the PNP current mirror 15 having no current flowing through the third resistor R3. Therefore, the gate to source voltage of the MOSFET Q1 is zero volt, and the drain current of the MOSFET Q1 is zero ampere. Then, the analog signal is input into the analog signal input 11, through the first resistor R1 and the first optical coupler 23, and into the output of the first operational amplifier 13 to form a current loop. The first output anode and the first output cathode couple the analog signal, and the coupled analog signal flows through the second resistor R2 to provide the analog signal to the analog signal output 21. The analog signal input 11 and the analog signal output 21 are not commonly grounded because of the first optical coupler 23. In the embodiment, a resistance of the first resistor R1 is same as a resistance of the second resistor R2, and therefore the voltage of the analog signal input 11 would be same as the voltage of the analog signal output 21.

In a digital signal transmitting mode of the isolated signal transmitting circuit 10 and the isolated signal receiving circuit 20, the voltage of the analog signal input 11 is set same as the ground, namely zero volt. Then, the digital signal is input into the digital signal input 12. When the voltage of the digital signal is zero volt, which means digital signal zero, the PNP current mirror 15 has current flowing through the third resistor R3. Therefore, the gate to source voltage of the MOSFET Q1 is not zero, the MOSFET Q1 is on, and the MOSFET Q1 has the drain current. The drain current flows from the output of the first operational amplifier 13, through the second optical coupler 24, the fourth resistor R4, and the MOSFET Q1, and then into the power input negative terminal VN. Further, the drain current is coupled to the second output anode and the second output cathode of the second optical coupler 24. The coupled drain current flows through the fifth resistor R5, the second output anode and the second output cathode of the second optical coupler 24, and the digital signal output 22 is grounded because the second output cathode of the second optical coupler 24 is grounded. Therefore, the digital signal output 22 can determine the digital signal zero.

On the other hand, when the voltage of the digital signal input 12 is same as the voltage of the power input positive terminal VCC, which means digital signal one, the PNP current mirror 15 has no current flowing through the third resistor R3. Therefore, the gate to source voltage of the MOSFET Q1 is zero volt, the MOSFET Q1 is off, and the MOSFET Q1 has no drain current. Then the drain cannot be coupled to the second output anode and the second output cathode of the second optical coupler 24. The second output anode and the second output cathode of the second optical coupler 24 have no current flowing through, and the voltage of the second optical coupler 24 is same as the power output positive terminal VCC'. Therefore, the digital signal output 22 can determine the digital signal one.

Figure 2:
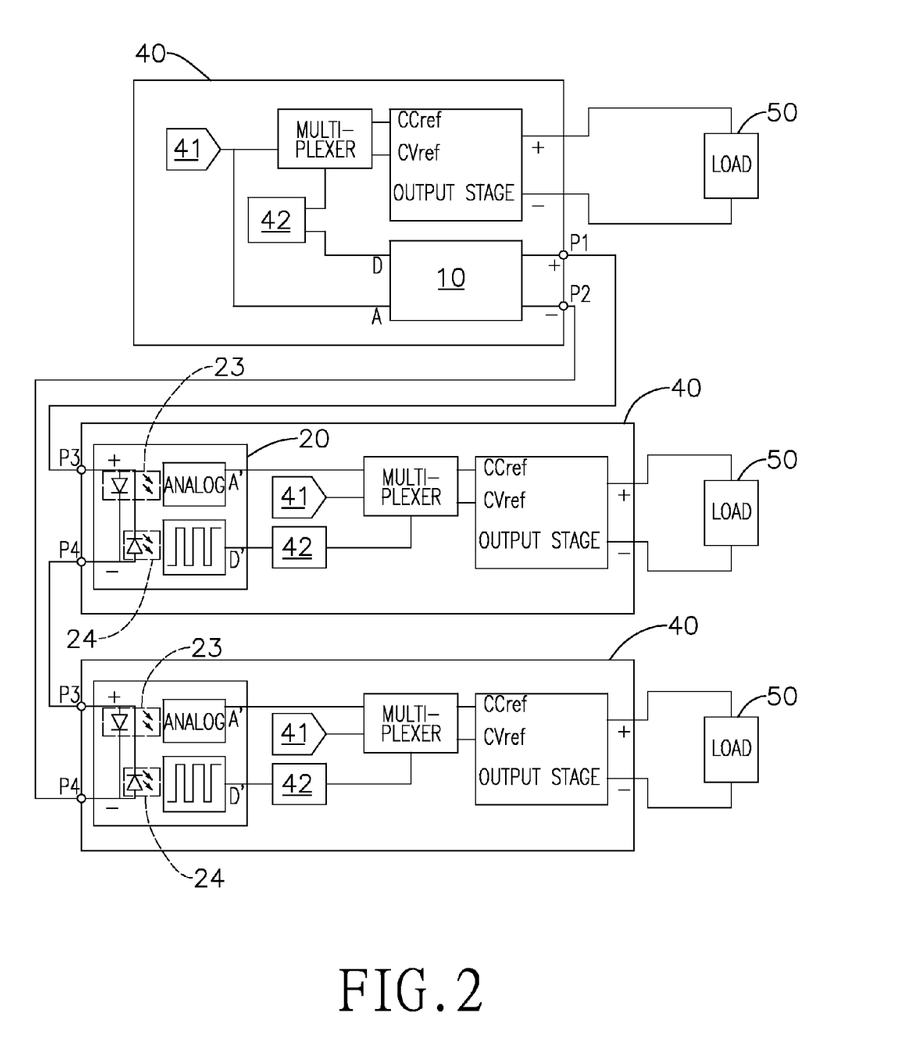
FIG. 2 is a block diagram of an embodiment of the present invention adapted to multiple power supplies to provide electric power to multiple loads.

Further with reference to FIG. 2, the isolated signal transmitting circuit 10 and the isolated signal receiving circuit 20 are connected by the first optical coupler 23 and the second optical coupler 24 to isolate the analog signal input 11 and the analog signal output 21 with the digital signal input 12 and the digital signal output 22. The isolated signal transmitting circuit 10 and the isolated signal receiving circuit 20 are not commonly grounded.

When multiple power supplies 40 respectively supply electric power to multiple loads 50 and the multiple loads 50 cannot be commonly grounded, a user can set one of the multiple power supplies 40 to be a master power supply and the other power supplies 40 to be slave power supplies. The master power supply has the isolated signal transmitting circuit 10, and the slave power supplies have the isolated signal receiving circuits 20. The isolated signal receiving circuits 20 of the slave power supplies are electronically connected to the isolated signal transmitting circuit 10 of the master power supply, and the user can control the multiple power supplies 40 by only controlling the master power supply to turn on the multiple power supplies 40 simultaneously or respectively.

The power supply 40 comprises a digital to analog converter 41, a multiplexer, a micro controller 42, and an output stage. An output of the digital to analog converter 41 is electronically connected to the multiplexer to transmit the analog signals to the multiplexer. The multiplexer is electronically connected to the micro controller 42, and further transmits the analog signals to the micro controller 42. The micro controller 42 is electronically connected to the digital signal input 12 of the isolated signal transmitting circuit 10. The digital to analog converter 41 is further electronically connected to the analog signal input 11 of the isolated signal transmitting circuit 10 to transmit the analog signals directly to the analog signal input 11.

The isolated signal transmitting circuit 10 and the isolated signal receiving circuit 20 are easily connected. For example, only two electric wires are needed to electronically connect the first cross port P1 of the isolated signal transmitting circuit 10 with the third cross port P3 of the isolated signal receiving circuit 20, and to electronically connect the second cross port P2 of the isolated signal transmitting circuit 10 with the fourth cross port P4 of the isolated signal receiving circuit 20. When the isolated signal receiving circuits 20 are multiple, one third cross port P3 of one isolated signal receiving circuit 20 is electronically connected to the fourth cross port P4 of another one isolated signal receiving circuit 20.

With reference to FIG. 1, in the embodiment, the isolated signal transmitting circuit 10 further comprises an input speedup circuit 14a and the isolated signal receiving circuit 20 further comprises an output speedup circuit 14b. The input speedup circuit 14a comprises a sixth resistor R6. The sixth resistor R6 is electronically connected between the power input positive terminal VCC and the negative input of the first operational amplifier 13 to provide a speedup current to the first optical coupler 23 for speeding up the first optical coupler 23 to switch on. In the embodiment, the speedup current is one micro ampere.

Because of the speedup current of the input speedup circuit 14a, the analog signals determined at the analog signal output 21 would have an error. Therefore, the isolated signal receiving circuit 20 has the output speedup circuit 14b to counterbalance the error. The output speedup circuit 14b comprises a second operational amplifier 141 and a seventh resistor R7. The second operational amplifier 141 comprises a positive input, a negative input, and an output. The positive input of the second operational amplifier 141 is grounded, the negative input of the second operational amplifier 141 is electronically connected to the first output anode of the first optical coupler 23, and the output of the second operational amplifier 141 is electronically connected to the analog signal output 21. The seventh resistor R7 is electronically connected between the negative input of the second operational amplifier 141 and the power output positive terminal VCC', and a resistance of the seventh resistor R7 matches a resistance of the sixth resistor R6 to produce a same speedup current for counterbalancing the error.

The coupled analog signal with the error flows through the first optical coupler 23. The coupled analog signal with the error is added by the speedup current produced by the output speedup circuit 14b and a current flowing through the second resistor R2. The speedup current produced by the output speedup circuit 14b is same as the error caused by the input speedup circuit 14a, and therefore the remaining current flowing through the second resistor R2 equals the original analog signal input into the analog signal input 11.

Besides, each optical coupler has a current transfer ratio. When a current transfer ratio of the optical coupler is not enough for coupling current without error, the optical coupler cannot couple out correct signals. Therefore, the isolated signal receiving circuit 20 further comprises an inverse transform circuit 25. The inverse transform circuit 25 comprises a third optical coupler 251, a first transform resistor Ra, a second transform resistor Rb, a first inverse resistor Ra', a second inverse resistor Rb', and a third operational amplifier 252. The third optical coupler 251 comprises a third input anode, a third input cathode, a third output anode, and a third output cathode. The third operational amplifier 252 comprises a positive input, a negative input, and an output. In the embodiment, power of the second operational amplifier 141 and the third operational amplifier 252 are supplied by the power output positive terminal VCC' and the power output negative terminal VN'.

The first output anode of the first optical coupler 23 is directly electronically connected to a first end of the first transform resistor Ra and a first end of the second transform resistor Rb. The first output cathode of the first optical coupler 23 is also electronically connected to the power output negative terminal VN'. A second end of the first transform resistor Ra is grounded, and a second end of the second transform resistor Rb is electronically connected to the positive input of the third operational amplifier 252.

The third output anode of the third optical coupler 251 is electronically connected to a first end of the first inverse resistor Ra' and a first end of the second inverse resistor Rb'. A second end of the first inverse resistor Ra' is grounded, and a second end of the second inverse resistor Rb' is electronically connected to the negative input of the third operational amplifier 252. The third output cathode of the third optical coupler 251 is electronically connected to the power output negative terminal VN'. The third input anode of the third optical coupler 251 is electronically connected to the second resistor R2, and the third input cathode of the third optical coupler 251 is electronically connected to the output of the third operational amplifier 252.

A current transfer ratio of the third optical coupler 251 is same as a current transfer ratio of the first optical coupler 23 to counterbalance an error caused by the first optical coupler 23 without enough current transfer ratio. The analog signal coupled out by the first optical coupler 23 is inversely transferred by the inverse transform circuit 25 to counterbalance the error for providing a correct analog signal to the analog signal output 21.

When the digital signal is transmitted, the digital signal only comprises the digital signal zero and the digital signal one. Therefore, even if there is an error between the digital signal input 12 and the digital signal output 22, it would not influence correctness of the digital signal.

Figure 3:
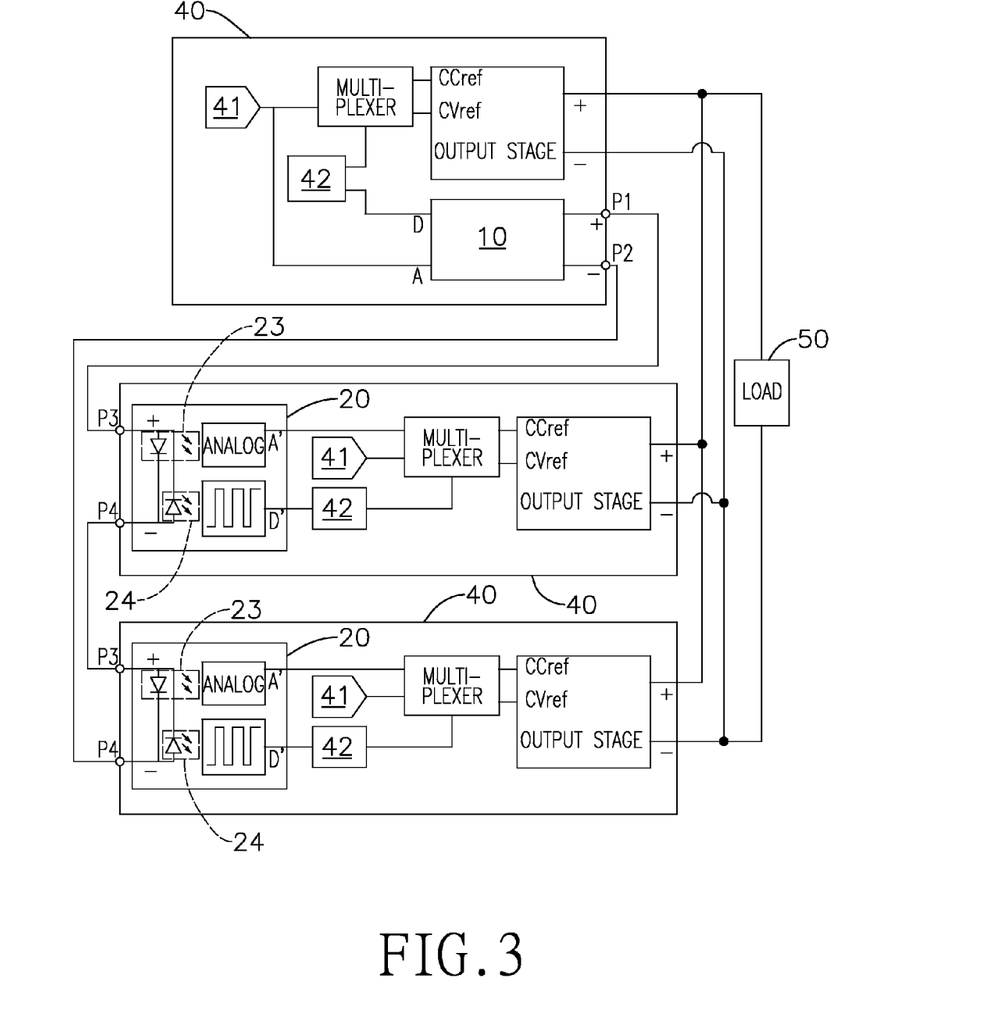
FIG. 3 is a block diagram of an embodiment of the present invention adapted to multiple power supplies connected in parallel to provide electric power to a load.
Figure 4:
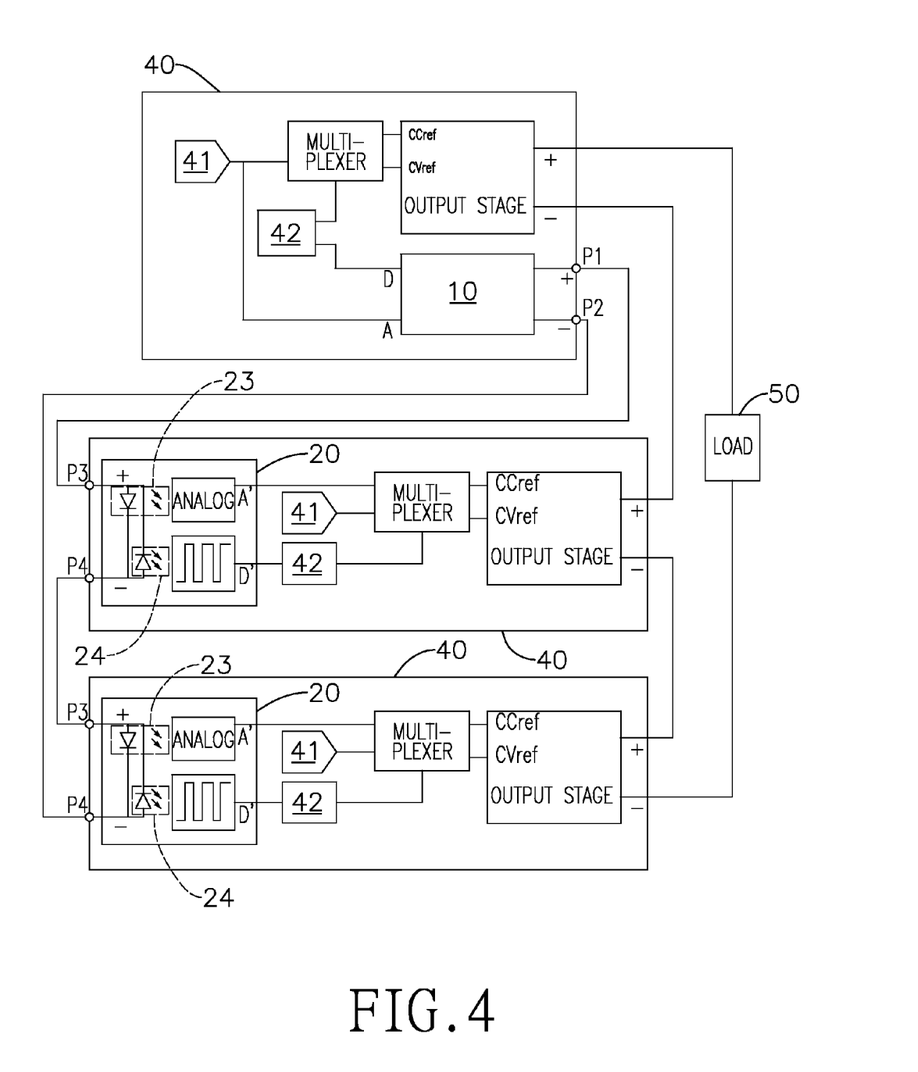
FIG. 4 is a block diagram of an embodiment of the present invention adapted to multiple power supplies connected in series to provide electric power to a load.

With reference to FIGS. 3 and 4, the multiple power supplies 40 can be electronically connected in parallel or in series to provide electric power to the load 50. The isolated signal transmitting circuit 10 and the isolated signal receiving circuits 20 of the present invention are easily connected, and the isolated signal transmitting circuit 10 and each isolated signal receiving circuit 20 are not commonly grounded. When the loads 50 cannot be commonly grounded and the user needs to turn on the multiple power supplies 40 simultaneously or respectively, the present invention can be adopted.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An isolated signal transmitting circuit, comprising:
   an analog signal input;
   a digital signal input;
   a first cross port;
   a second cross port;
   a first operational amplifier, comprising a positive input, a negative input and an output;
   wherein the positive input is grounded, the negative input is electronically connected to the first cross port and also connected to the analog signal input through a first resistor, and the output is electronically connected to the second cross port;
   a metal-oxide-semiconductor field-effect transistor (MOSFET), comprising a gate, a source and a drain;
   wherein the source is electronically connected to a power input negative terminal and also connected to the gate through a third resistor, and the drain is electronically connected to the negative input of the first operational amplifier through a fourth resistor;
   a PNP current mirror, comprising:
      a first PNP transistor, comprising an emitter, a base and a collector;
      wherein the emitter is electronically connected to a power input positive terminal, and the base is electronically connected to the collector;
      a second PNP transistor, comprising an emitter, a base and a collector;
      wherein the emitter of the second PNP transistor is electronically connected to the power input positive terminal, the base of the second PNP transistor is electronically connected to the base of the first PNP transistor, and the collector of the second PNP transistor is electronically connected to the gate of the MOSFET; and
   an eighth resistor electronically connected between the collector of the first PNP transistor and the digital signal input.

2. The isolated signal transmitting circuit as claimed in claim 1, further comprising an input speedup circuit;
   wherein the input speedup circuit comprises a sixth resistor electronically connected between the power input positive terminal and the negative input of the first operational amplifier.

3. An isolated signal receiving circuit, comprising:
   a third cross port;
   a fourth cross port;
   a first optical coupler comprising a first input anode, a first input cathode, a first output anode, and a first output cathode;
   wherein the first input anode is electronically connected to the third cross port, the first input cathode is electronically connected to the fourth cross port, and the first output cathode is electronically connected to a power output negative terminal;
   a second optical coupler, comprising a second input anode, a second input cathode, a second output anode, and a second output cathode;
   wherein the second input anode is electronically connected to the fourth cross port, the second input cathode is electronically connected to the third cross port, the second output anode is electronically connected to a power output positive terminal through a fifth resistor, and the second output cathode is grounded;
   an analog signal output, connected to the first output anode of the first optical coupler through a second resistor; and
   a digital signal output, electronically connected to the second output anode of the second optical coupler.

4. The isolated signal receiving circuit as claimed in claim 3, further comprising an output speedup circuit;
   wherein the output speedup circuit comprises:
   a second operational amplifier, comprising a positive input, a negative input, and an output; wherein the positive input of the second operational amplifier is grounded, the negative input of the second operational amplifier is electronically connected to the first output anode of the first optical coupler, and the output of the second operational amplifier is electronically connected to the analog signal output; and
   a seventh resistor, electronically connected between the negative input of the second operational amplifier and the power output positive terminal.

5. The isolated signal receiving circuit as claimed in claim 3, further comprising an inverse transform circuit, and the inverse transform circuit comprising:
   a third operational amplifier, comprising a positive input, a negative input, and an output;
   a first inverse resistor, comprising a first end and a second end;
   wherein the second end of the first inverse resistor is grounded;
   a second inverse resistor, comprising a first end and a second end;
   wherein the second end of the second inverse resistor is electronically connected to the negative input of the third operational amplifier;
   a third optical coupler, comprising a third input anode, a third input cathode, a third output anode, and a third output cathode;
   wherein the third input anode of the third optical coupler is electronically connected to the second resistor, the third input cathode of the third optical coupler is electronically connected to the output of the third operational amplifier, the third output anode is electronically connected to the first end of the first inverse resistor and the first end of the second inverse resistor, and the third output cathode of the third optical coupler is electronically connected to the power output negative terminal;
   a first transform resistor, comprising a first end and a second end;
   wherein the first end of the first transform resistor is electronically connected to the first output anode of the first optical coupler, and the second end of the first transform resistor is grounded; and
   a second transform resistor, comprising a first end and a second end;

wherein the first end of the second transform resistor is electronically connected to the first output anode of the first optical coupler, and the second end of the second transform resistor is electronically connected to the positive input of the third operational amplifier.

6. The isolated signal receiving circuit as claimed in claim 4, further comprising an inverse transform circuit, and the inverse transform circuit comprising:
a third operational amplifier, comprising a positive input, a negative input, and an output;
a first inverse resistor, comprising a first end and a second end;
wherein the second end of the first inverse resistor is grounded;
a second inverse resistor, comprising a first end and a second end;
wherein the second end of the second inverse resistor is electronically connected to the negative input of the third operational amplifier;
a third optical coupler, comprising a third input anode, a third input cathode, a third output anode, and a third output cathode;
wherein the third input anode of the third optical coupler is electronically connected to the second resistor, the third input cathode of the third optical coupler is electronically connected to the output of the third operational amplifier, the third output anode is electronically connected to the first end of the first inverse resistor and the first end of the second inverse resistor, and the third output cathode of the third optical coupler is electronically connected to the power output negative terminal;
a first transform resistor, comprising a first end and a second end;
wherein the first end of the first transform resistor is electronically connected to the first output anode of the first optical coupler, and the second end of the first transform resistor is grounded; and
a second transform resistor, comprising a first end and a second end;
wherein the first end of the second transform resistor is electronically connected to the first output anode of the first optical coupler, and the second end of the second transform resistor is electronically connected to the positive input of the third operational amplifier.

7. An isolated signal transmitting device, comprising an isolated signal transmitting circuit and an isolated signal receiving circuit, wherein:
the isolated signal transmitting circuit comprises:
an analog signal input;
a digital signal input;
a first cross port;
a second cross port;
a first operational amplifier, comprising a positive input, a negative input, and an output;
wherein the positive input is grounded, the negative input is electronically connected to the first cross port and also connected to the analog signal input through a first resistor, and the output is electronically connected to the second cross port;
a metal-oxide-semiconductor field-effect transistor (MOSFET), comprising a gate, a source and a drain;
wherein the source is electronically connected to a power input negative terminal and also connected to the gate through a third resistor, and the drain is electronically connected to the negative input of the first operational amplifier through a fourth resistor;
a PNP current mirror, comprising:
a first PNP transistor, comprising an emitter, a base and a collector;
wherein the emitter is electronically connected to a power input positive terminal, and the base is electronically connected to the collector;
a second PNP transistor, comprising an emitter, a base and a collector;
wherein the emitter of the second PNP transistor is electronically connected to the power input positive terminal, the base of the second PNP transistor is electronically connected to the base of the first PNP transistor, and the collector of the second PNP transistor is electronically connected to the gate of the MOSFET; and
an eighth resistor, electronically connected between the collector of the first PNP transistor and the digital signal input; and
the isolated signal receiving circuit comprises:
a third cross port;
a fourth cross port;
a first optical coupler, comprising a first input anode, a first input cathode, a first output anode, and a first output cathode;
wherein the first input anode is electronically connected to the third cross port, the first input cathode is electronically connected to the fourth cross port, and the first output cathode is electronically connected to a power output negative terminal;
a fifth resistor;
a second optical coupler, comprising a second input anode, a second input cathode, a second output anode, and a second output cathode;
wherein the second input anode is electronically connected to the fourth cross port, the second input cathode is electronically connected to the third cross port, the second output anode is electronically connected to a power output positive terminal through a fifth resistor, and the second output cathode is grounded;
a second resistor;
an analog signal output, electronically connected to the first output anode of the first optical coupler through a second resistor; and
a digital signal output, electronically connected to the second output anode of the second optical coupler.

8. The isolated signal transmitting device as claimed in claim 7, wherein:
the isolated signal transmitting circuit further comprises an input speedup circuit;
wherein the input speedup circuit comprises a sixth resistor electronically connected between the power input positive terminal and the negative input of the first operational amplifier; and
the isolated signal receiving circuit further comprises an output speedup circuit;
wherein the output speedup circuit comprises:
a second operational amplifier, comprising a positive input, a negative input, and an output;
wherein the positive input of the second operational amplifier is grounded, the negative input of the second operational amplifier is electronically connected to the first output anode of the first optical coupler, and the output of the second operational amplifier is electronically connected to the analog signal output; and
a seventh resistor, electronically connected between the negative input of the second operational amplifier and the power output positive terminal.

9. The isolated signal transmitting device as claimed in claim 7, wherein the isolated signal transmitting circuit further comprises an inverse transform circuit, and the inverse transform circuit comprises:
- a third operational amplifier, comprising a positive input, a negative input, and an output;
- a first inverse resistor, comprising a first end and a second end;
- wherein the second end of the first inverse resistor is grounded;
- a second inverse resistor, comprising a first end and a second end;
- wherein the second end of the second inverse resistor is electronically connected to the negative input of the third operational amplifier;
- a third optical coupler, comprising a third input anode, a third input cathode, a third output anode, and a third output cathode;
- wherein the third input anode of the third optical coupler is electronically connected to the second resistor, the third input cathode of the third optical coupler is electronically connected to the output of the third operational amplifier, the third output anode is electronically connected to the first end of the first inverse resistor and the first end of the second inverse resistor, and the third output cathode of the third optical coupler is electronically connected to the power output negative terminal;
- a first transform resistor, comprising a first end and a second end;
- wherein the first end of the first transform resistor is electronically connected to the first output anode of the first optical coupler, and the second end of the first transform resistor is grounded; and
- a second transform resistor, comprising a first end and a second end;
- wherein the first end of the second transform resistor is electronically connected to the first output anode of the first optical coupler, and the second end of the second transform resistor is electronically connected to the positive input of the third operational amplifier.

10. The isolated signal transmitting device as claimed in claim 8, wherein the isolated signal transmitting circuit further comprises an inverse transform circuit, and the inverse transform circuit comprises:
- a third operational amplifier, comprising a positive input, a negative input, and an output;
- a first inverse resistor, comprising a first end and a second end;
- wherein the second end of the first inverse resistor is grounded;
- a second inverse resistor, comprising a first end and a second end;
- wherein the second end of the second inverse resistor is electronically connected to the negative input of the third operational amplifier;
- a third optical coupler, comprising a third input anode, a third input cathode, a third output anode, and a third output cathode;
- wherein the third input anode of the third optical coupler is electronically connected to the second resistor, the third input cathode of the third optical coupler is electronically connected to the output of the third operational amplifier, the third output anode is electronically connected to the first end of the first inverse resistor and the first end of the second inverse resistor, and the third output cathode of the third optical coupler is electronically connected to the power output negative terminal;
- a first transform resistor, comprising a first end and a second end;
- wherein the first end of the first transform resistor is electronically connected to the first output anode of the first optical coupler, and the second end of the first transform resistor is grounded; and
- a second transform resistor, comprising a first end and a second end;
- wherein the first end of the second transform resistor is electronically connected to the first output anode of the first optical coupler, and the second end of the second transform resistor is electronically connected to the positive input of the third operational amplifier.

* * * * *